J. P. DAVIES.
Meat-Tenderer.

No. 207,107. Patented Aug. 20, 1878.

Attest:
W. T. Baker
C. B. Baker

INVENTOR:
John P. Davies,
By R. G. Dyrenforth,
Attorney.

UNITED STATES PATENT OFFICE.

JOHN P. DAVIES, OF CHICAGO, ILLINOIS, ASSIGNOR OF ONE-HALF HIS RIGHT TO ROBERT R. WILLIAMS, OF SAME PLACE.

IMPROVEMENT IN MEAT-TENDERERS.

Specification forming part of Letters Patent No. 207,107, dated August 20, 1878; application filed May 11, 1878.

*To all whom it may concern:*

Be it known that I, JOHN P. DAVIES, of the city of Chicago, in the county of Cook and State of Illinois, have invented certain new and useful Improvements in Meat-Tenderers; and I hereby declare the following to be a full, clear, and exact description thereof, reference being had to the accompanying drawings, of which—

Figure 1:
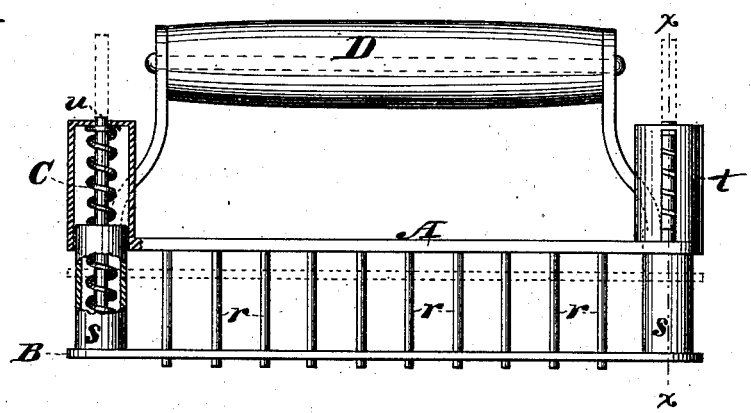
Figure 2:
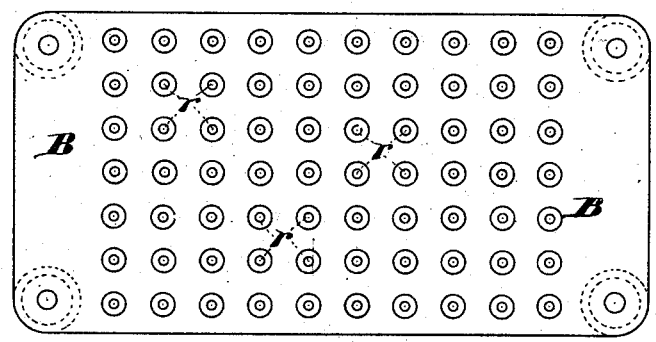

Figure 1 is a side view of my device; Fig. 2, a bottom view, and Fig. 3 a detail view.

My invention relates to meat-tenderers of the class in which a perforated spring-plate slides upward over the teeth as the latter are pressed into the meat, the spring-plate resuming its normal position at or near the extremities of the teeth by the reaction of the springs as the device is raised, thus holding the meat down upon the board.

Devices designed to perform substantially this function have hitherto been contrived; but in all cases such devices have consisted of a bed-plate having hinged to it at one end an upper plate worked by means of a lever and carrying the teeth and the spring-plate. The defect in these devices is, that since it is necessary to move the meat underneath the teeth by means of a detached plate, or the like, the bone must in all cases be previously removed, often to the great detriment of the meat. Otherwise not only is the device incapable of producing the desired results, but the teeth are liable to become fractured or bent in the operation.

The object of my invention is to overcome the above defects by producing a device capable of performing all the desired functions without the previous removal of the bone from the steak, or whatever it may be, and which shall also be much more simple and convenient than those hitherto in use.

To this end my invention consists in constructing the device with an upper plate carrying teeth, and with a perforated spring-plate, as aforesaid, but adapted to be held immediately in the hand and moved over the meat, (the latter remaining stationary,) whereby all the desired effects may be produced and contact of the teeth with the bone readily avoided.

My improvement consists, also, in combining, with the device, cylinders inclosing the springs, to preserve them from moisture and consequent rust, and arranged in such manner as not to impede their action, all as hereinafter more fully set forth.

Referring to the drawings, A is the upper plate, carrying the teeth *r r*; and B, the spring-plate, perforated to correspond with the teeth, and retained, normally, at or near the ends of the same by the springs C. D is the handle, which may be of any suitable construction.

Figure 3:
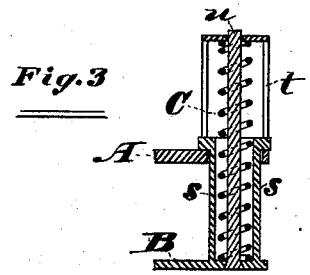

The device, Fig. 3, for protecting the springs from the moisture incidental to the operation of a meat-tenderer, is as follows: *s* is a sleeve attached to the spring-plate, inclosing the spring, and passing through a hole in the upper plate into the cylindrical cap *t*, within which it is adapted to slide, and near the bottom of which it terminates when the spring-plate is at its lowest point. The cap is perforated at the top for the passage of the guide-rod *u*.

The spring-plate may be retained in place either by nuts at the projecting ends of the guide-rods, or by lugs attached either to the guide-rods or the sleeves *s*, and working in slots in the caps *t*, or by any other suitable means.

What I claim as new, and desire to secure by Letters Patent, is—

The meat-tenderer herein described, consisting of plates A B, teeth *r*, sleeves *s*, caps *t*, rods *u*, springs C, and handle D.

JOHN P. DAVIES.

In presence of—
H. E. WOOKEY,
E. F. MERRILL.